(12) United States Patent
Lee (10) Patent No.: US 7,373,479 B2
(45) Date of Patent: May 13, 2008

(54) METHOD TO ALLOW PCI HOST BRIDGE (PHB) TO HANDLE PRE-FETCH READ TRANSACTIONS ON THE PCI BUS WHICH ACCESS SYSTEM MEMORY THROUGH TRANSLATION CONTROL ENTRY (TCE) TABLE

(75) Inventor: Van Hoa Lee, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 10/809,594

(22) Filed: Mar. 25, 2004

(65) Prior Publication Data

US 2005/0216642 A1 Sep. 29, 2005

(51) Int. Cl.
*G06F 12/00* (2006.01)
*G06F 13/28* (2006.01)

(52) U.S. Cl. .................... 711/206; 710/22; 711/205; 711/207

(58) Field of Classification Search ............... None
See application file for complete search history.

(56) References Cited

U.S. PATENT DOCUMENTS 6,675,329 B1 * 1/2004 Im ........................... 714/718
6,981,120 B1 * 12/2005 Barrus et al. ................ 711/200
2002/0124063 A1 * 9/2002 Foster et al. ................ 709/221
2002/0124194 A1 * 9/2002 Dawkins et al. ............ 713/310

OTHER PUBLICATIONS

Andrew Tanenbaum and Albert Woodhull, Operating System: Design and Implementation, 1997, Prentice Hall, Second Edition, pp. 327-329.*

* cited by examiner

*Primary Examiner*—Reginald G. Bragdon
*Assistant Examiner*—Shawn X. Gu
(74) *Attorney, Agent, or Firm*—Duke W. Yee; Diana R. Gerhardt; Theodore D. Fay, III

(57) ABSTRACT

A method, system, and computer instructions for providing valid translation entries in the TCE table for all supported DMA addresses to prevent the occurrence of system errors due to prefetching. The mechanism of the present invention reserves a page in system memory. This reserved page is made unavailable to the operating system and may not be utilized by any software in the system. The reserved page is also written with all bytes set to 0xFF. The system firmware then selects a region in system memory for the TCE table. The TCE table is initialized, with all entries within the TCE table initialized to be valid as well as contain the corresponding address of the reserved page. In this manner, all supported DMA page addresses will have valid TCE entries which translate the DMA addresses into the reserved page memory. Thus, prefetched DMA addresses will not encounter invalid DMA address translation, and crash the system.

8 Claims, 6 Drawing Sheets

Figure 1

Prior Art

METHOD TO ALLOW PCI HOST BRIDGE (PHB) TO HANDLE PRE-FETCH READ TRANSACTIONS ON THE PCI BUS WHICH ACCESS SYSTEM MEMORY THROUGH TRANSLATION CONTROL ENTRY (TCE) TABLE

BACKGROUND OF THE INVENTION

1. Technical Field

The present invention relates generally to an improved data processing system. In particular, the present invention relates to a method, apparatus, and computer instructions for providing valid translation entries in the translation control entry (TCE) table for all supported direct memory access (DMA) addresses.

2. Description of Related Art

Current peripheral component interconnect (PCI) host bridges (PHB) provide for DMA transfers, as practiced by the IBM iSeries and pSeries computer platforms, which include a level of address translation called a translation control entry (TCE) table. Systems that require access to system memory beyond 32-bit address implementations employ TCE tables for translating 32-bit DMA addresses into the system's larger physical address space. In particular, existing PCI host bridges employ TCE tables to allow a 32-bit PCI I/O adapter to access system memory beyond the 32-bit address limit. A TCE table may be implemented for each PHB to support all input/output (I/O) adapters on the primary PCI bus or on the secondary PCI buses of any PCI-PCI bridges attached to the primary PCI bus. Each TCE entry may also contain valid bits to control access permission.

TCE tables within logically partitioned platforms are maintained by a firmware component known as the hypervisor, which insures that the data within the TCE table directs the DMA accesses of I/O adapters to the proper target memory. Once the TCE entries are established for the DMA accesses, the hardware will handle the movement of the data between the I/O devices and the system memory. Currently, the hypervisor requires that this target memory is owned by the partition owning the I/O adapter.

DMA address translations may also be "prefetched" in order to improve system performance. For example, in systems with PCI-PCI bridge that provide for PCI prefetch transactions, instead of only reading data from memory for the current DMA request, a data prefetch unit can monitor the DMA address stream requested by the controller and make educated guesses as to the next sequential DMA address likely to be requested in the future. In this manner, the data for the next sequential DMA address should be prefetched and cached into the internal buffer so that the data is ready to be read by the controller (thus avoiding delays or latency that would otherwise occur if the data were not fetched until actually being called for by the controller). Thus, DMA to physical system memory may be prefetched and stored in a cache buffer for quicker system performance.

However, an invalid DMA address translation may be generated on the primary PCI bus by a PCI to PCI bridge for a DMA read transfer initiated by a master PCI agent on the secondary PCI bus due to prefetching. For example, a prefetching action is issued by a PCI-PCI bridge and received at the PHB's TCE logic unit. When the DMA read transfer reaches the end of a page (e.g., 4 KB page), the PCI-PCI bridge's prefetch unit does not know whether or not the next page should be translated. Consequently, the DMA address translation at the PHB's logic unit may be invalid due to cross page boundary prefetching. When a DMA address does not have a valid translation, a sophisticated PHB implementation generates a synchronized exception to the processor to recover the error.

PHBs in some systems, however, do not have this recovery capability. An example of such as system is the JS20 Blade Server, a product of IBM Corporation located in Armonk, N.Y. Upon encountering an invalid DMA address translation, these systems experience a checkstop error, wherein the system becomes unrecoverable. A checkstop error occurs when the system hardware has detected a condition, that it cannot resolve, and which prevents normal operation. While disabling prefetching will remedy the checkstop problem, disabling prefetching will also negatively impact system performance.

Therefore, it would be advantageous to have an improved method, apparatus, and computer instructions for providing valid translation entries in the TCE table for all supported DMA addresses to prevent the occurrence of system errors due to prefetching.

SUMMARY OF THE INVENTION

The present invention provides a method, system, and computer instructions for providing valid translation entries in the TCE table for all supported DMA addresses to prevent the occurrence of system errors due to prefetching. The mechanism of the present invention reserves a page in system memory. This reserved page is made unavailable to the operating system and may not be utilized by any software in the system. The reserved page is also written with all bytes set to 0xFF. The system firmware then selects a region in system memory for the TCE table. The TCE table is initialized, with all entries within the TCE table initialized to be valid. In addition, each entry in the TCE table is initialized to contain the corresponding address of the reserved page. In this manner, all supported DMA page addresses will have valid TCE entries which translate the DMA addresses into the reserved page memory when they are not used by I/O adapters.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein;

DETAILED DESCRIPTION OF THE PREFERRED EMBODIMENT

Figure 1:
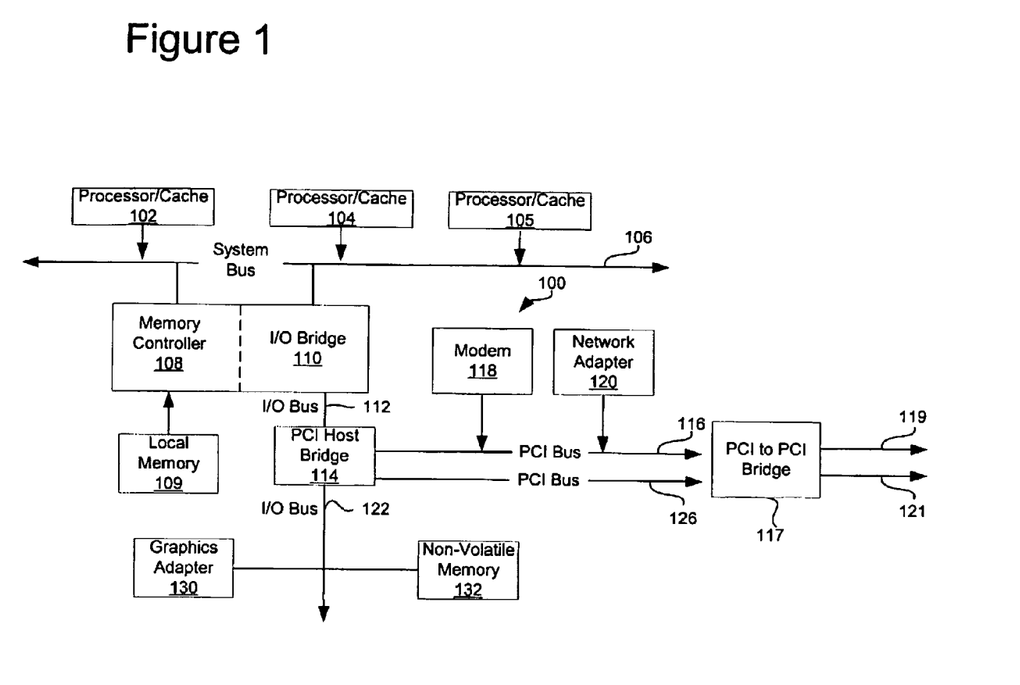
FIG. 1 is a block diagram of a data processing system in which the present invention may be implemented.

Referring now to FIG. 1, a block diagram of a data processing system in which the present invention may be implemented is depicted. Data processing system 100 may be a symmetric multiprocessor (SMP) system including a plurality of processors/caches 102, 104, and 105 connected to system bus 106. Although only three processors are depicted, the present invention may be implemented using a data processing system with other numbers of processors. Alternatively, a single processor system may be employed. Also connected to system bus 106 is memory controller 108, which provides an interface to local memory 109. I/O bus bridge 110 is connected to system bus 106 and provides an interface to I/O bus 112. Memory controller 108 and I/O bus bridge 110 may be integrated as depicted.

Peripheral component interconnect (PCI) host bridge 114 is connected to I/O bus 112 provides an interface to PCI local busses 116 and 126. A number of PCI-compliant adapters may be connected to PCI local busses 116 and 126. PCI-to-PCI bridge 117 provides an interface to PCI bus 119 and PCI bus 121. Typical PCI bus implementations will support four PCI expansion slots or add-in connectors. Communications links to other systems and devices may be provided through modem 118 and network adapter 120 connected to PCI local bus 116 through add-in boards. In this manner, data processing system 100 allows connections to multiple network computers. A memory-mapped graphics adapter 130 and non-volatile memory 132 may also be connected to I/O bus 122 as depicted, either directly or indirectly.

The data processing system depicted in FIG. 1 may be implemented using various commercially available computer systems. For example, data processing system 100 may be implemented using IBM eServer pSeries JS20 Blade system, a product of International Business Machines Corporation in Armonk, N.Y., running the Advanced Interactive Executive (AIX) operating system or LINUX operating system.

Those of ordinary skill in the art will appreciate that the hardware depicted in FIG. 1 may vary. For example, other peripheral devices, such as hard disk and optical disk drives and the like, also may be used in addition to or in place of the hardware depicted. The depicted example is not meant to imply architectural limitations with respect to the present invention.

The present invention provides a method, apparatus, and computer instructions for providing valid translation entries in the TCE table for all supported DMA addresses. When a DMA address reference arrives at the PHB, a translation mechanism is used to look up an entry in the TCE table corresponding to the supplied DMA address in order to determine the location of the physical memory.

The mechanism of the present invention, in the illustrative examples, ensures that all supported DMA addresses will be successfully translated. As a result, the PCI host bridge may properly handle prefetch transactions and prevent the occurrence of a checkstop error. System firmware first reserves a 4 KB page in system memory and sets aside system memory space for the TCE table. The reserved 4 KB page is made unavailable to the operating system, such that other system software may not access this reserved space. The reserved 4 KB page memory is written with all bytes set to 0xFF for debug purposes. This step allows for identifying if the invalid DMA address has been handled when tracing the DMA transaction on the PCI bus. When the TCE table is initialized, each entry in the TCE table will be initialized as valid, as well as contain the address of the corresponding reserved 4 KB page.

Figure 2:
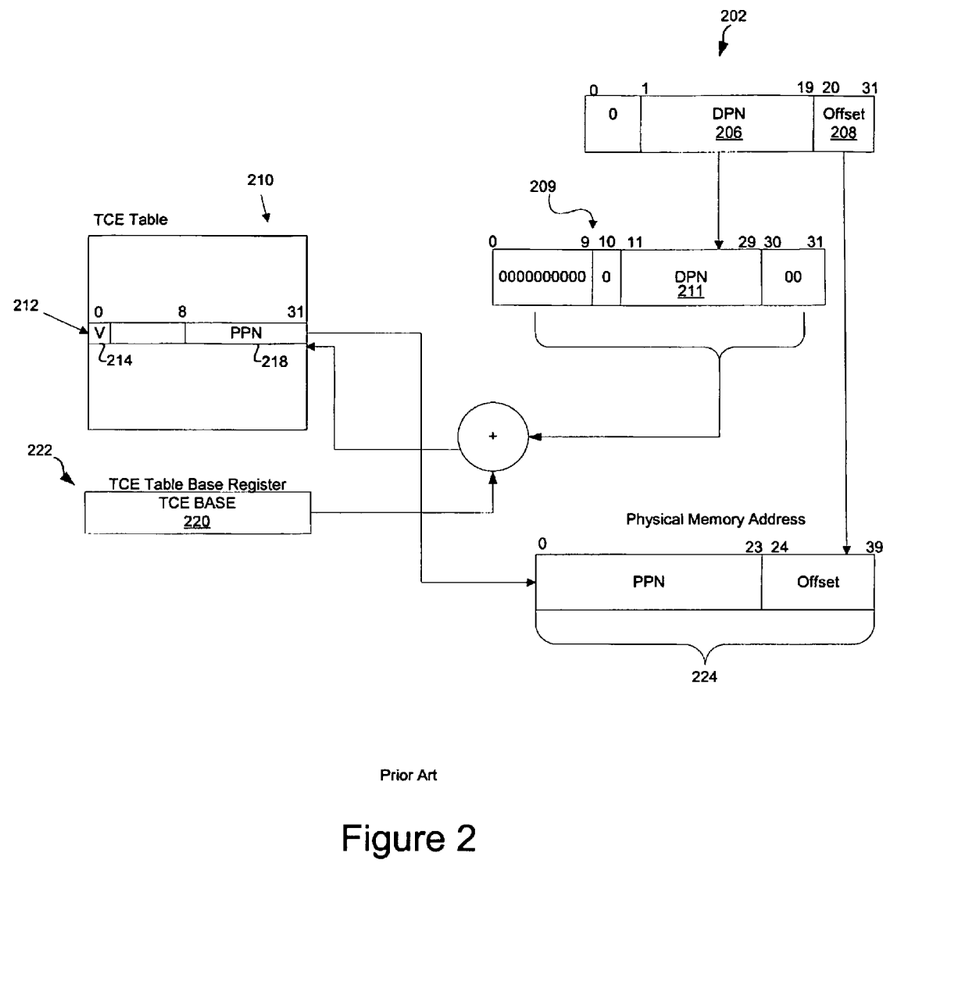
FIG. 2 is a block diagram illustrating a traditional form of DMA address mapping for a 32-bit data block.

FIG. 2 illustrates a traditional form of DMA address mapping for a 32-bit data block. DMA address 202 includes DMA page number 206 and offset within the page 208. Translation control entry (TCE) table 210 includes multiple page entries, such as page entry 212. Page entry 212 includes valid bit 214 and physical page number 218. A particular page entry in TCE table 210 is located by first generating the index to TCE table 210 which is the concatenation of 0s to the DMA page number 206 as shown in index 209. Index 209 will be added to TCE base 220 in TCE table base register 222 to obtain the physical address of page entry 212 in TCE table 210.

As mentioned previously, page entry 212 includes physical page number 218 and valid bit 214 indicating whether the mapping is valid. If valid bit 214 is set (i.e., V-bit=1), TCE table 210 supplies the corresponding physical page number 218 (i.e., the starting address of the page in memory) to the hardware to generate the final physical memory address. If valid bit 214 is off (i.e., V-bit=0), then the DMA page is not mapped in memory.

From TCE table 210, physical page number 218 is identified. DMA address offset within the page 208 is then added to physical page number 218 to produce physical memory address 224.

The present invention provides a remedy for systems that cannot recover from an error due to an invalid DMA translation in the TCE table. The present invention solves the problem of having an invalid DMA address translation generated on the primary PCI bus by a PCI to PCI bridge for a DMA read transfer initiated by a master PCI agent on the secondary PCI bus. As mentioned previously, an invalid DMA address translation may be generated when a PCI-PCI bridge issues a prefetching action. Prefetching is desired to improve the overall performance of a data processing system by making educated guesses as to which data stored in main system memory are likely to be requested in the future, and thus should be prefetched into the cache buffer so that they are ready to be read by the controller. Prefetching avoids delays or latency that would otherwise occur if the data were not fetched until called for by the controller.

When the PCI bridge attempts to prefetch across page boundaries, the PCI bridge may not know if there is a translation available for the DMA address. Consequently, the translation in the TCE table for the DMA address will be invalid. System hardware, such as the JS20 Blade Server, will return an error in response to encountering an invalid DMA address translation, and the error will result in the system being checkstopped and unrecoverable. By providing valid translation entries in the TCE for all supported DMA addresses, the present invention provides a mechanism for preventing a checkstop from occurring due to prefetching.

Figure 3:
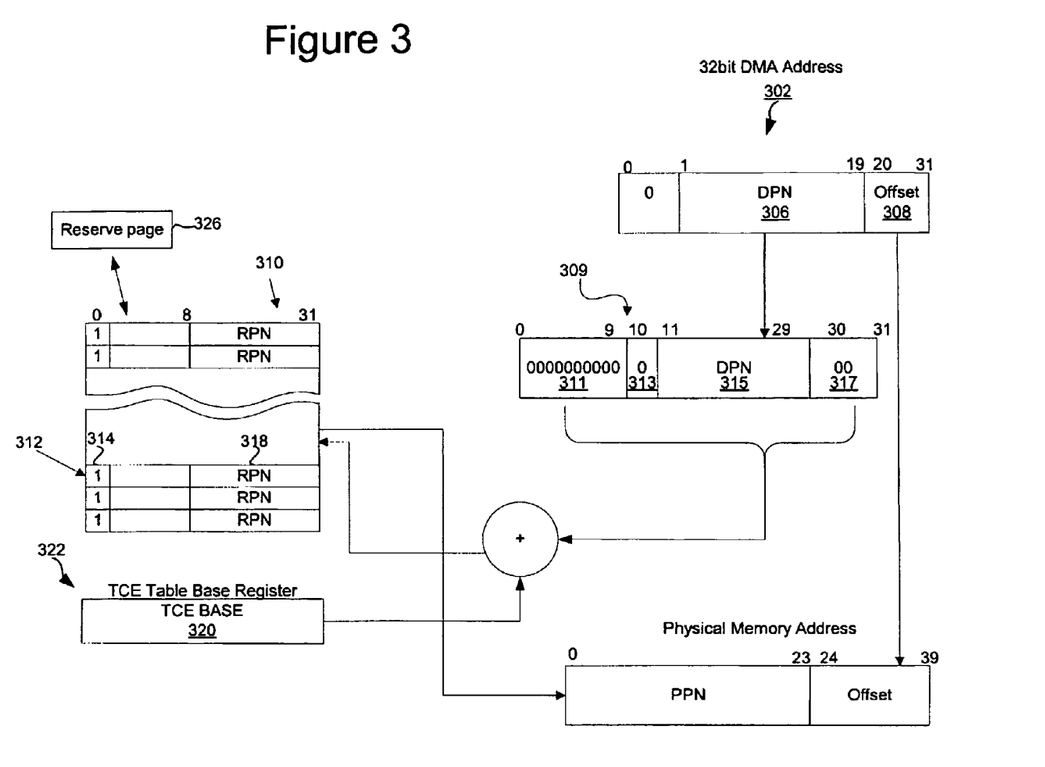
FIG. 3 is a block diagram of a TCE translation process in accordance with a preferred embodiment of the present invention.

Turning now to FIG. 3, a block diagram of a DMA address to physical address translation is depicted in accordance with a preferred embodiment of the present invention. FIG. 3 illustrates the initial state of the translation hardware, in which the TCE table is initialized with valid entries containing reserved page numbers. DMA address 302 may be provided by a PCI device for accessing a memory location. As shown in FIG. 3, DMA address 302 includes DMA page number 306 and offset within the page 308 of DMA address 302.

When 32-bit DMA address 302 is received by the DMA-to-physical address translation mechanism of the present invention, a lookup of the TCE table entry corresponding to given DMA address 302 is performed. DMA page number 306 in DMA address 302 is used to obtain index 309 to TCE table 310. Index 309 is an offset from the base address of the TCE table. As each table entry is 4 bytes, the following calculation may be used to acquire index 309:

TCE table index=DMA page number*4

For example, if TCE table 310 is a 2 MB table, DMA page number*4 is equivalent to shifting the DMA page number two bits to the left with 00 filled in at the end for field 317. Fields 311 and 313 are also filled with 0s since the size of the TCE table is 2 MB.

System firmware, such as the hypervisor, may place TCE table 310 at any location in system memory. The location is recorded by a base register, such as TCE table base register 322. Index 309 is used to locate a particular page entry in TCE table 310 by adding index 309 to base register 322 to obtain the physical address of the page entry 312 in TCE table 310. TCE table 310 may include multiple page entries, each of which includes valid bit field 314 and reserved page number 318.

As illustrated, the present invention employs a reserved page number in the TCE table in place of the physical page number used in existing translation systems when the entries are not used by the operating system. When TCE table 310 is initialized, the system firmware reserves a 4 KB page in system memory. This reserved 4 KB page, such as reserved page 326, is unavailable to the operating system and may not be utilized by any software in the system. Reserved 4 KB page 326 is also written with all bytes set to 0xFF. The system firmware then selects a region in system memory for TCE table 310. As TCE table is initialized, all entries within TCE table 310 are initialized to be valid. In other words, all valid bits in TCE table 310, such as valid bit 314, are set to "1". In addition, each entry in TCE table 310 is initialized to contain the corresponding address of reserved 4 KB page 326. In this manner, all valid bits are set, and TCE table 310 may supply the corresponding reserved page numbers.

The translation hardware of the PHB adds DMA address offset within the page 308 in order to generate the entire physical memory address that comprises reserved page number 326 and DMA address offset within the page 308. The reserved system memory may now be accessed without encountering an invalid DMA address translation, and thus a checkstop will not occur when a prefetched DMA address is not used by the I/O adapter.

As described above, all supported DMA 4 KB page addresses will contain valid TCE table entries which translate the DMA 4 KB pages into the reserved 4 KB page memory. Subsequently, as the operating system starts to handle the I/O device driver's DMA address allocation and DMA translation requests, the operating system may call the hypervisor firmware to update the TCE entries with actual DMA address translations as needed.

Furthermore, when the operating system no longer needs a TCE entry, the operating system may call the hypervisor firmware to remove the DMA translation. As the hypervisor does not allow direct access to the TCE table, hypervisor calls must be made to modify TCE table entries. The process of removing the translation does not entail making the entry invalid. Rather, the hypervisor retains the entry as valid and reinitializes the entry back to the default translation (i.e., the address of the reserved 4 KB page).

Figure 4:
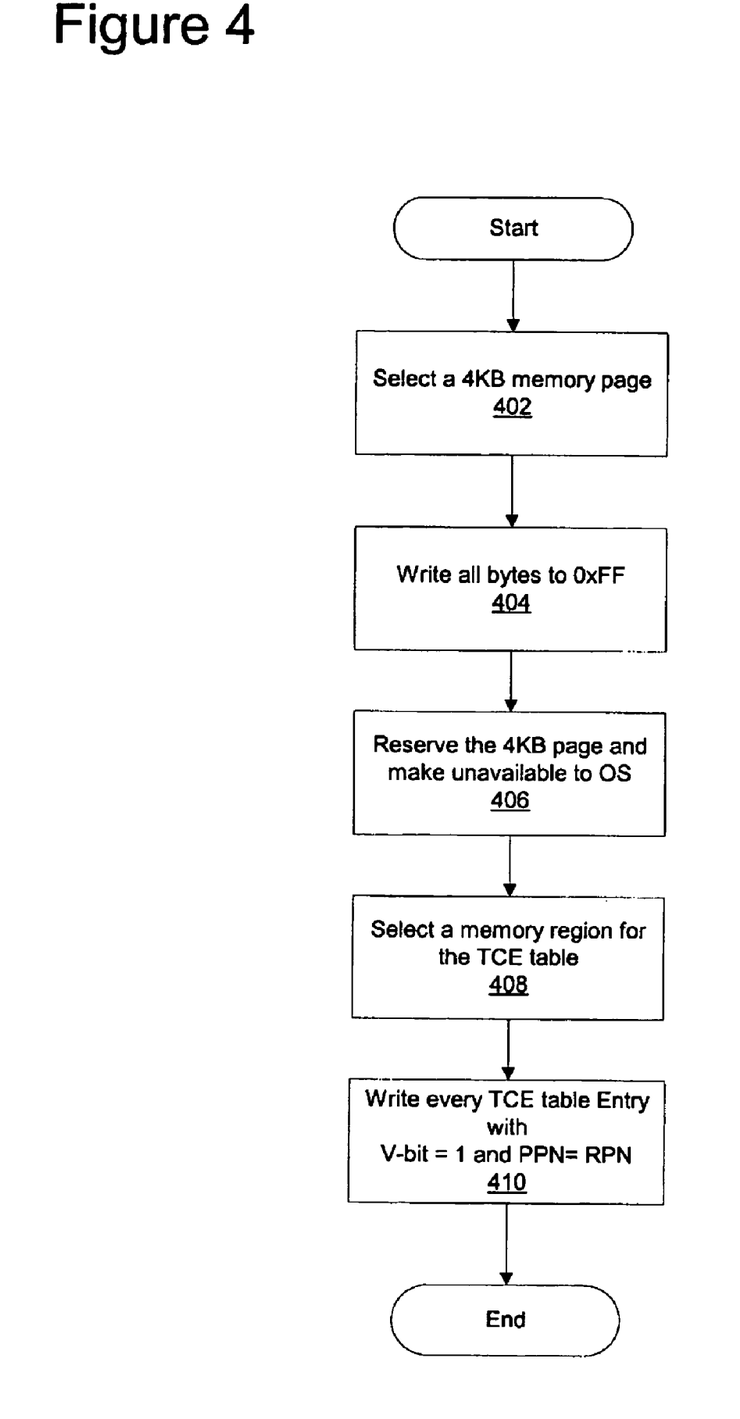
FIG. 4 is a flowchart of a process for initializing the TCE table in accordance with a preferred embodiment of the present invention.
Figure 5:
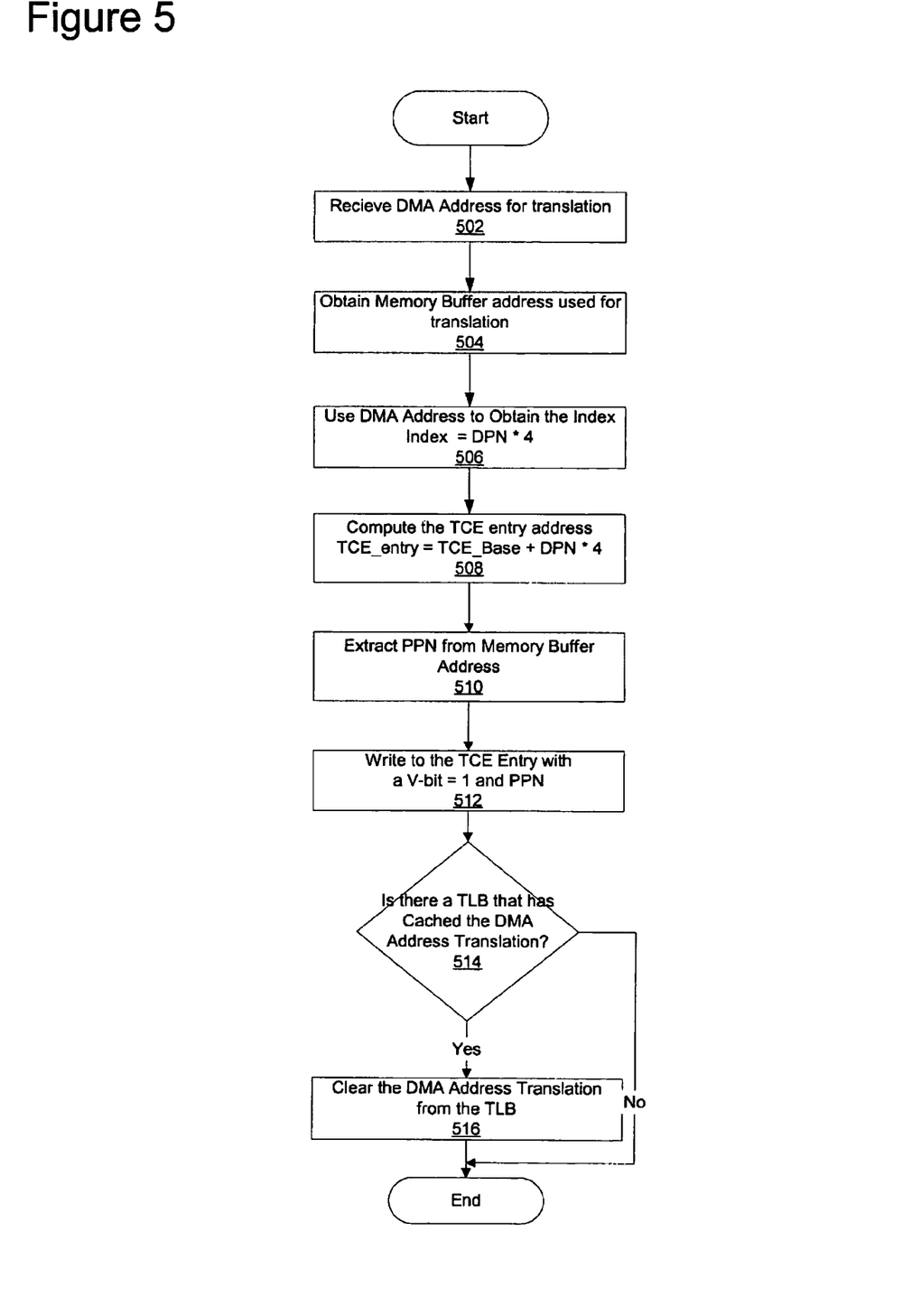
FIG. 5 is a flowchart of a process for updating an entry in the TCE table with system memory buffer addresses for DMA in accordance with a preferred embodiment of the present invention.
Figure 6:
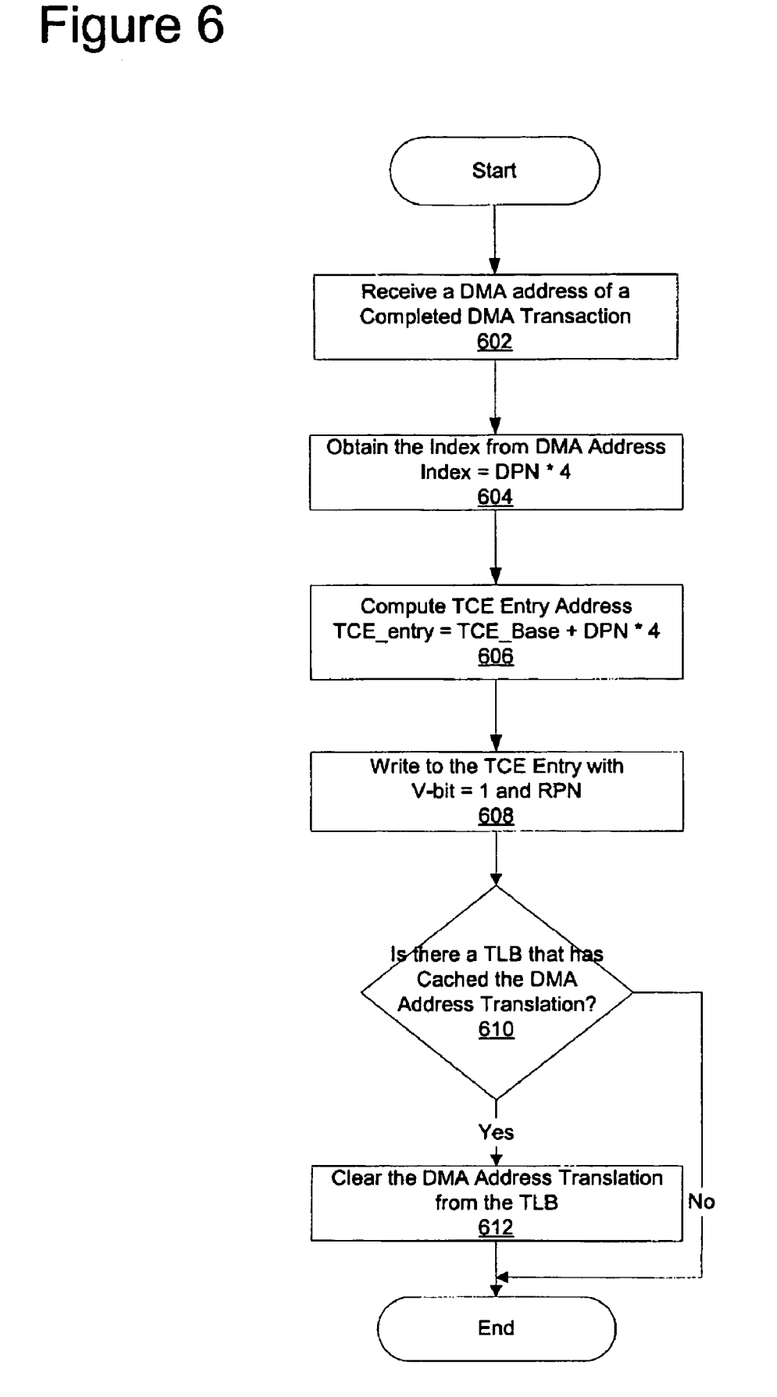
FIG. 6 is a flowchart of a process for removing an entry in the TCE table of a complete DMA transaction in accordance with a preferred embodiment of the present invention.

FIGS. 4, 5, and 6 are flowcharts outlining exemplary processes of the present invention. In particular, FIG. 4 is a flowchart outlining a process for initializing a TCE table in accordance with a preferred embodiment of the present invention. The flowchart in FIG. 4 is employed to initialize the TCE table illustrated in FIG. 3. As shown in FIG. 4, the process begins by having the system firmware select a page in system memory (step 402). For example, the selected page may be 4 KB reserved memory page 326 as described in FIG. 3. The system firmware writes the 4 KB page with all bytes set to 0xFF (step 404). The selected 4 KB page is reserved and made unavailable to the operating system, such that the reserved page may not be used by any software in the system (step 406).

Next, the system firmware selects a region of system memory for the TCE table (step 408). Although an individual TCE table may be as large as 8 MB, the preferred embodiment of the present invention comprises a 2 MB TCE table having 512K 4-byte entries. Once the TCE table space is allocated, each entry within the TCE table is written to be valid and to contain the reserved page number (step 410). For example, the valid bit in each entry may be set to "1". In addition, the physical page number for each entry may be initialized to hold the reserved page number. The operation then terminates.

FIG. 5 is a flowchart outlining an exemplary operation of the present invention for updating a TCE entry with the system memory buffer address used by a DMA transaction. The flowchart in FIG. 5 is employed to update the TCE table illustrated in FIG. 3. The operation starts by receiving a DMA address for translation (step 502). The system firmware then obtains the system memory buffer address to be used for the DMA translation (step 504). This memory buffer address is provided by the operating system when it asks the hypervisor to update the TCE entry. As previously mentioned above, the DMA address is used to obtain the index of the TCE table (step 506). For example, if the table contains 4-byte entries, the index may be obtained by multiplying the DMA page number in the DMA address by four, or Index=DMA page number*4.

Once the TCE table index is acquired, the particular table entry's physical address may be computed (step 508). The table entry's physical address may be computed by adding the TCE table base register to the DMA page number multiplied by four, or TCE_Entry=TCE_Base+DMA page number*4.

Next, the physical page number is extracted from the memory buffer address (step 510). The entry within the TCE table is written to be valid and to contain the address of the physical page number (step 512). A determination is then made as to whether there is a translation look-aside buffer (TLB) that cached the DMA address translation (step 514). A translation lookaside buffer (TLB) is a table in the PHB that contains cross-references between the DMA and physical addresses of recently referenced DMA address pages. The TLB functions like a "hot list," or quick-lookup index, of the DMA address pages that have been most recently translated. If there is no TLB that cached the DMA address translation, the process then terminates. If such a TLB entry exists, the system firmware clears out the DMA address translation that is cached in the hardware TLB (step 516) to allow the new translation to work in the future, and the process terminates thereafter.

FIG. 6 is a flowchart outlining an exemplary process for removing an entry in the TCE table of a complete DMA transaction in accordance with a preferred embodiment of the present invention. The flowchart in FIG. 6 is employed to remove an entry in the TCE table illustrated in FIG. 3. The process begins by receiving the DMA address for a completed DMA transaction (step 602). The DMA address is used to obtain the index of the TCE table (step 604) by multiplying the DMA page number in the DMA address by four. Once the TCE table index is acquired, the completed TCE entry address may be computed (step 606). The table entry may be computed by adding the TCE table base register to the DMA page number multiplied by four, or TCE_Entry=TCE_Base+DMA page number*4.

Next, the system firmware writes to the particular table entry corresponding to the DMA address, wherein the entry is written to be valid (i.e., valid bit=1) and to contain the reserved page number (step 608). A determination is then made as to whether there is a translation look-aside buffer (TLB) that cached the DMA address translation (step 610). If there is no TLB that cached the DMA address translation, the process then terminates. If such a TLB entry exists, the system firmware first clears out the DMA address translation that is cached in the hardware TLB (step 612) so that future translation of the DMA page will be translated into the reserved memory page, and the process terminates thereafter.

Thus, the present invention provides a method, apparatus, and computer instructions for providing valid translation entries in the TCE table for all supported DMA addresses. The present invention provides a mechanism for preventing a checkstop from occurring during a DMA address to physical address translation due to prefetching. System hardware, such as the JS20 Blade Server, will return an error in response to encountering an invalid DMA address translation, and the error will result in the system being checkstopped and unrecoverable. While disabling prefetching will remedy the checkstop problem, disabling prefetching will also negatively impact system performance.

In these illustrative examples, a 4 KB page is reserved in system memory. System firmware, such as a hypervisor, is used to set aside the system memory space for the TCE table. The reserved 4 KB page is made unavailable to the operating system, such that other system software may not access this reserved space. The reserved 4 KB page memory is written with all bytes set to 0xFF. When the TCE table is initialized, each entry in the TCE table will be initialized as valid, as well as contain the address of the corresponding reserved 4 KB page. As a result, all valid bits are set for each supported DMA address, and the TCE table may supply the corresponding reserved page numbers. The reserved system memory may now be accessed by prefetching and without a checkstop occurring when the prefetched DMA address has not been mapped by the operating system.

Subsequently, as the operating system starts to handle the I/O device driver's DMA address allocation and DMA translation requests, the operating system may call the hypervisor firmware to update the TCE entries with actual DMA address translations as needed. When the operating system no longer needs a TCE entry, the operating system may call the hypervisor firmware to remove the DMA translation by retaining the entry as valid and reinitializing the entry back to the default translation (i.e., the address of the reserved 4 KB page).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for providing valid translation entries in a translation control entry table for all supported direct memory addresses, comprising:
    reserving a page in system memory to form a reserved page;
    writing the reserved page;
    selecting a region in the system memory for the translation control entry table;
    initializing all entries in the translation control entry table, wherein all entries are initialized to be valid and contain an address of the reserved panel; and
    updating an entry in the translation control entry table, wherein a physical memory page replaces the reserved page when the entry is used by an operating system's device driver.

2. The method of claim 1, further comprising:
    restoring the entry in the translation control entry table with the reserved page when the entry is no longer used by an operating system.

3. The method of claim 1, further comprising:
    determining whether a direct memory address translation corresponding to the entry has been cached in a translation lookaside buffer; and
    responsive to a determination that the direct memory address translation exists, clearing the direct memory address translation from the translation lookaside buffer.

4. The method of claim 1, wherein the page in the system memory is inaccessible to an operating system running on the data processing system.

5. The method of claim 1, wherein writing the reserved page includes setting all bytes within the reserved page to 0xFF.

6. The method of claim 1, wherein initializing all entries to be valid includes setting all valid bits to "1".

7. The method of claim 1, wherein the translation control entry table comprises a 2 MB Translation Control Entry table having 512K 4-byte entries.

8. The method of claim 1, wherein the reserved page is utilized for DMA address translation.

* * * * *